United States Patent
Stattin et al.

(10) Patent No.: US 10,143,012 B2
(45) Date of Patent: Nov. 27, 2018

(54) RANDOM ACCESS PROCEDURE IN WIRELESS DEVICE, RADIO BASE STATION AND METHODS THEREIN

(71) Applicant: Telefonaktiebolaget L M Ericsson (publ), Stockholm (SE)

(72) Inventors: Magnus Stattin, Upplands Väsby (SE); Gunnar Bergquist, Kista (SE); Tao Cui, Upplands Väsby (SE); Mats Folke, Vällingby (SE); Gunnar Mildh, Sollentuna (SE); Elena Myhre, Järfälla (SE); Mikael Wittberg, Uppsala (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 231 days.

(21) Appl. No.: 14/892,690

(22) PCT Filed: May 21, 2014

(86) PCT No.: PCT/SE2014/050621
§ 371 (c)(1),
(2) Date: Nov. 20, 2015

(87) PCT Pub. No.: WO2014/189453
PCT Pub. Date: Nov. 27, 2014

(65) Prior Publication Data
US 2016/0105912 A1    Apr. 14, 2016

Related U.S. Application Data

(60) Provisional application No. 61/825,593, filed on May 21, 2013.

(51) Int. Cl.
*H04W 74/08*    (2009.01)
*H04L 12/24*    (2006.01)

(52) U.S. Cl.
CPC ..... *H04W 74/0833* (2013.01); *H04L 41/0654* (2013.01); *H04W 74/08* (2013.01)

(58) Field of Classification Search
None
See application file for complete search history.

(56) References Cited

U.S. PATENT DOCUMENTS

2009/0186624 A1*  7/2009  Cave ............... H04L 1/1887
                                              455/450
2010/0202288 A1*  8/2010  Park ............... H04W 48/08
                                              370/230

(Continued)

FOREIGN PATENT DOCUMENTS

GB    2461780 A    1/2010

OTHER PUBLICATIONS

Unknown, Author, "3GPP TS 36.321 V11.2.0 (Mar. 2013)", 3rd Generation Partnership Project; Technical Specification Group Radio Access Network; Evolved Universal Terrestrial Radio Access (E-UTRA); Medium Access Control (MAC) protocol specification (Release 11), Mar. 2013, pp. 1-56.

(Continued)

*Primary Examiner* — George C Atkins
(74) *Attorney, Agent, or Firm* — Murphy, Bilak & Homiller, PLLC

(57) ABSTRACT

Embodiments herein relate to a wireless device (10) for handling access to a radio base station (12) in a wireless communication network (1), the wireless device (10) being configured to:
 initiate a random access procedure in the wireless communication network (1);
 determine that a problem with the random access procedure has occurred when a certain condition is fulfilled; and (Continued)

perform at least one of the following, when determined that a problem with the random access procedure has occurred: delay a next random access preamble transmission attempt; abort from a higher layer the random access procedure immediately; and stop the random access procedure at a lower layer.

5 Claims, 9 Drawing Sheets

(56) References Cited

U.S. PATENT DOCUMENTS

| | | | | |
|---|---|---|---|---|
| 2011/0274040 A1* | 11/2011 | Pani | ............... | H04W 4/005 370/328 |
| 2012/0002555 A1* | 1/2012 | Ohuchi | ............ | H04W 24/08 370/244 |
| 2013/0143547 A1* | 6/2013 | Ye | ............ | H04W 74/0841 455/422.1 |
| 2014/0098752 A1* | 4/2014 | Venkata | ............ | H04W 52/146 370/329 |
| 2018/0070403 A1* | 3/2018 | Uemura | ............ | H04W 4/04 |

OTHER PUBLICATIONS

Unknown, Author, "Discussion on Whether to Stop RA Procedure when RA Failure Occurs", 3GPP TSG RAN WG2 #77 bis, R2-121529, ITRI, Jeju, Korea, Mar. 26-30, 2012, pp. 1-5.

Unknown, Author, "Random Access Procedure Model", 3GPP TSG-RAN WG2 #61bis, Tdoc R2-082029, Ericsson (Rapporteur), Shenzhen, China, Mar. 31-Apr. 4, 2008, pp. 1-4.

Unknown, Author, "RRC-MAC Interaction for Random Access", 3GPP TSG-RAN Wg2#62bis, R2-083562, Motorola, Warsaw, Poland, Jun. 30-Jul. 4, 2008, pp. 1-4.

\* cited by examiner

RANDOM ACCESS PROCEDURE IN WIRELESS DEVICE, RADIO BASE STATION AND METHODS THEREIN

TECHNICAL FIELD

Embodiments herein relate to a wireless device, a radio base station, methods therein, a computer program and a computer-readable storage medium. In particular, embodiments herein relate to handling access to a radio base station.

BACKGROUND

In a typical radio communications network, also known as a cellular radio system or a wireless communication network, wireless devices, also known as mobile stations, wireless terminals and/or user equipments (UEs), communicate via a Radio Access Network (RAN) to one or more core networks. The radio access network covers a geographical area which is divided into cell areas, with each cell area being served by a base station, e.g., a radio base station (RBS), which in some networks may also be called, for example, a "NodeB" or "eNodeB". A cell is a geographical area where radio coverage is provided by the radio base station at a base station site or an antenna site in case the antenna and the radio base station are not collocated. Each cell is identified by an identity within the local radio area, which is broadcast in the cell. Another identity identifying the cell uniquely in the whole mobile network is also broadcasted in the cell. One base station may have one or more cells. A cell may be downlink and/or uplink cell. The base stations communicate over the air interface operating on radio frequencies with the wireless devices within range of the base stations. Transmissions towards the base station from the wireless device is called uplink (UL) transmissions, and transmissions towards the wireless device from the radio base station is called downlink (DL) transmissions.

A Universal Mobile Telecommunications System (UMTS) is a third generation mobile communication system, which evolved from the second generation (2G) Global System for Mobile Communications (GSM). The UMTS terrestrial radio access network (UTRAN) is essentially a RAN using wideband code division multiple access (WCDMA) and/or High Speed Packet Access (HSPA) for wireless devices. In a forum known as the Third Generation Partnership Project (3GPP), telecommunications suppliers propose and agree upon standards for third generation networks and UTRAN specifically, and investigate enhanced data rate and radio capacity. In some versions of the RAN as e.g. in UMTS, several base stations may be connected, e.g., by landlines or microwave, to a controller node, such as a radio network controller (RNC) or a base station controller (BSC), which supervises and coordinates various activities of the plural base stations connected thereto. The RNCs are typically connected to one or more core networks.

Specifications for the Evolved Packet System (EPS) have been completed within the 3$^{rd}$ Generation Partnership Project (3GPP) and this work continues in the coming 3GPP releases. The EPS comprises the Evolved Universal Terrestrial Radio Access Network (E-UTRAN), also known as the Long Term Evolution (LTE) radio access, and the Evolved Packet Core (EPC), also known as System Architecture Evolution (SAE) core network. E-UTRAN/LTE is a variant of a 3GPP radio access technology wherein the radio base stations are directly connected to the EPC core network rather than to RNCs. In general, in E-UTRAN/LTE the functions of a RNC are distributed between the radio base stations, e.g. eNodeBs in LTE, and the core network. As such, the Radio Access Network (RAN) of an EPS has an essentially "flat" architecture comprising radio base stations without reporting to RNCs.

In modern cellular radio systems, the radio access network has a strict control on the behavior of the wireless device. Uplink transmission parameters like frequency, timing, and power are regulated via downlink control signaling from the base station to the wireless device.

At power-on or after a long standby time, the wireless device is not synchronized in the uplink transmissions. The wireless device can derive an uplink frequency and power estimate from e.g. the downlink control signals. However, a timing estimate is difficult to make since the round-trip propagation delay between the eNodeB, radio base station in LTE, and the wireless device is unknown. So even if wireless device uplink timing is synchronized to the downlink, UL transmissions may arrive too late at the eNodeB receiver because of the propagation delays. Therefore, before commencing traffic, the wireless device has to carry out a Random Access (RA) procedure to the RAN. After the RA or actually during RA procedure although after a RA preamble sequence transmission, eNodeB can estimate the timing misalignment of the wireless device uplink and send a correction message. During the RA, uplink parameters like timing and power are not very accurate. This poses extra challenges to the dimensioning of a RA procedure.

Usually, a Physical Random Access Channel (PRACH) is provided for the wireless device to request access to the network. A RA preamble is used which is based on a specific sequence with good correlation properties e.g. good auto-correlation. Because multiple wireless devices may request access at the same time, collisions may occur between requesting wireless devices. A contention resolution scheme has to be implemented to separate the wireless device transmissions. To distinguish between different wireless devices performing RA typically many different RA preambles exist. A wireless device performing RA randomly picks a RA preamble out of a pool of RA preambles and transmits the picked RA preamble. The RA preamble represents a random wireless device ID which may be used by the eNodeB when granting the wireless device access to the network. The eNodeB receiver may resolve RA attempts performed with different RA preambles and send a response message to each wireless device using the corresponding random wireless device IDs. In case that multiple wireless devices simultaneously use the same RA preamble a collision occurs and most likely the RA attempts are not successful since the eNodeB cannot distinguish between the two wireless devices with the same random wireless device ID.

To minimize the probability of collision the set of available sequences, i.e. RA preambles, should be large. In LTE the number of provided sequences per cell and RA opportunity is 64.

RA preambles assigned to adjacent cells are typically different to insure that a RA in one cell does not trigger any RA events in a neighboring cell.

LTE defines different RA configurations that differ in the amount of offered RA opportunities. A RA opportunity is approximately 1 MHz wide and either 1, 2, or 3 ms long within which the wireless device may transmit the RA preamble. In the configuration with the lowest number of opportunities one RA opportunity is offered every second radio frame, i.e. every 20 ms. On the other extreme the configuration with the highest density of RA opportunity offers one RA opportunity every subframe, i.e. every ms.

An eNodeB receiver listens at all RA opportunities to detect RA preambles. In case a RA preamble is successfully detected a RA response that includes an identifier or a number of the detected RA preamble is sent in a special message on the DL. A wireless device that has recently performed a RA attempt is listening within a certain time window after the RA preamble has been sent on the DL to receive a RA response. In case of a successful reception of the RA response the wireless device continues with steps of the RA procedure for contention resolution. In case no RA response is received within the specified window a new attempt is made. Also, if the contention resolution does not indicate that the wireless device won the contention, a new attempt is made. The power of this new RA preamble transmission is increased by a configured step size relative to the previous attempt. Depending on the back-off parameter in the wireless device, the wireless device may immediately re-try or wait for a random time depending on the configured back-off time prior a new attempt.

In addition to a contention-based RA procedure, LTE supports a contention-free variety of the RA procedure in which eNodeB directs the wireless device to use a specific RA preamble not simultaneously used by any other wireless device in the same cell and the steps of contention resolution are not needed.

If the number of unsuccessful RA attempts exceeds a configured threshold, lower layers in the wireless device indicate "random access problem" to higher layers. In e.g. LTE, Medium Access Control (MAC) layer indicates random access problem to Radio Resource Control (RRC) layer and continue random access attempts. Depending on higher layer state and conditions, higher layers declare radio link failure unless some higher layer procedure timer(s) are running or let the random access procedure continue until one or more higher layer procedure timers expire/time-out or a stopping condition is met.

E.g., to allow opportunity to recover from temporary radio problems and to accommodate various delays, e.g., for processing, inter-node communication etc, the duration of some higher layer procedures, including connection establishment, handover, radio link monitoring and connection reestablishment, are governed by timers. Durations of the timers may be configurable. Such timers in LTE comprise timer T300, related to connection establishment; timer T304, related to handover; timers T301 and T311, related to connection re-establishment; and timer T310, related to radio link monitoring.

Upon declaration of radio link failure (RLF), or upon time-out or stopping condition is met for the higher layer procedure, RRC layer resets lower layers, thereby aborting the ongoing random access procedure.

A connection re-establishment procedure provides an optimized means for recovering a connection after RLF and/or handover failure. The connection re-establishment procedure reduces the signalling compared to requesting a new connection by means of a connection establishment procedure. However, a problem of prior art is that it is the random access procedures during e.g. re-establishment procedures consume a rather large amount of radio resources, resulting in a rather large consumption of radio resources when accessing the wireless communications network.

SUMMARY

An object of embodiments herein is provide a mechanism for accessing a wireless communication network in an efficient manner.

According to an aspect the object is achieved by a method in a wireless device for handling access to a radio base station in a wireless communication network. The wireless device initiates a random access procedure in the wireless communication network. The wireless device determines that a problem with the random access procedure has occurred when a certain condition is fulfilled. The wireless device performs at least one of the following, when determined that a problem with the random access procedure has occurred: delaying a next random access preamble transmission attempt; aborting from a higher layer the random access procedure immediately; and stopping the random access procedure at a lower layer.

According to another aspect the object is achieved by a method in a radio base station for handling access to the radio base station in a wireless communication network. The radio base station transmits a value indicating a delay for the wireless device to wait when a counter number of random access attempts have been exceeded before proceeding to the transmission of a next random access preamble. The radio base station may additionally or alternatively, transmit an indication indicating a trigger for when to begin applying a delay, and/or an indication indicating an extended number of times of attempts of transmission of the random access preamble before stopping the random access procedure at the lower layer.

According to yet another aspect the object is achieved by a wireless device for handling access to a radio base station in a wireless communication network. The wireless device is configured to initiate a random access procedure in the wireless communication network. The wireless device is further configured to determine that a problem with the random access procedure has occurred when a certain condition is fulfilled. The wireless device is also configured to perform at least one of the following, when determined that a problem with the random access procedure has occurred: delay a next random access preamble transmission attempt; abort from a higher layer the random access procedure immediately; and stop the random access procedure at a lower layer.

According to still another aspect the object is achieved by a radio base station for handling access to the radio base station in a wireless communication network. The radio base station may be configured to transmit a value indicating a delay for the wireless device to wait when a counter number of random access attempts have been exceeded before proceeding to the transmission of a next random access preamble. Additionally or alternatively, the radio base station may transmit an indication indicating a trigger for when to begin applying a delay, and/or an indication indicating an extended number of times of attempts of transmission of the random access preamble before stopping the random access procedure at the lower layer.

Furthermore, a computer program is provided, comprising instructions which, when executed on at least one processor, cause the at least one processor to carry out the methods herein. Additionally, a computer-readable storage medium, having stored thereon a computer program, comprising instructions which, when executed on at least one processor, cause the at least one processor to carry out the methods herein.

An advantage of embodiments herein is to effectively reduce intensity of random access preamble transmission attempts for the random access procedure, resulting in a more radio resources efficient manner of utilizing radio resources when accessing the wireless communication network.

BRIEF DESCRIPTION OF THE DRAWINGS

Embodiments will now be described in more detail in relation to the enclosed drawings, in which.

DETAILED DESCRIPTION

Figure 1:
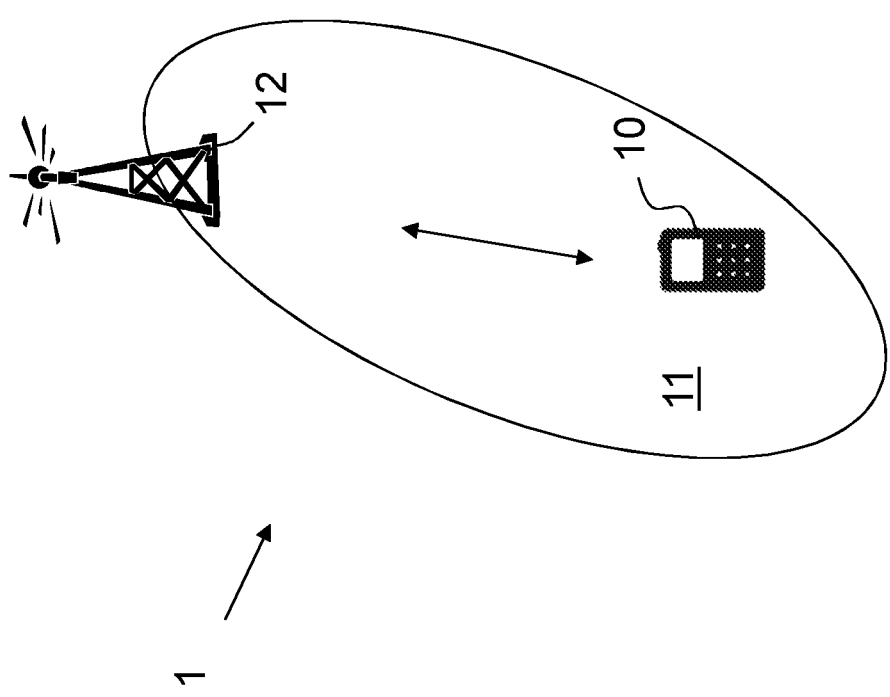
FIG. 1 is a schematic overview depicting a wireless communication network according to embodiments herein.

Embodiments herein relate to wireless communication networks in general. FIG. 1 is a schematic overview depicting, a radio communications network or a wireless communication network 1. The wireless communication network 1 comprises one or more RANs and one or more Core Networks (CN). The wireless communication network 1 may use a number of different technologies, such as Long Term Evolution (LTE), LTE-Advanced, Wideband Code Division Multiple Access (WCDMA), Global System for Mobile communications/Enhanced Data rate for GSM Evolution (GSM/EDGE), Worldwide Interoperability for Microwave Access (WiMax), or Ultra Mobile Broadband (UMB), just to mention a few possible implementations. The wireless communication network 1 is exemplified herein as an LTE network.

In the wireless communication network 1, a wireless device 10, also known as a mobile station, a user equipment and/or a wireless terminal, communicates via a Radio Access Network (RAN) to one or more Core Networks (CN). It should be understood by the skilled in the art that "wireless device" is a non-limiting term which means any wireless terminal, user equipment, Machine Type Communication (MTC) device, a Device to Device (D2D) terminal, or node e.g. Personal Digital Assistant (PDA), laptop, mobile phone, sensor, relay, mobile tablets or even a small base station communicating within respective cell.

The wireless communication network 1 covers a geographical area which is divided into cell areas, e.g. a cell 11 being served by a radio base station 12. The radio base station 12 may also be referred to as a first radio base station and e.g. a NodeB, an evolved Node B (eNB, eNode B), a base transceiver station, Access Point Base Station, base station router, or any other network unit capable of communicating with a wireless device within the cell served by the radio base station depending e.g. on the radio access technology and terminology used. The radio base station 12 may serve one or more cells, such as the cell 11.

A cell is a geographical area where radio coverage is provided by radio base station equipment at a base station site or at remote locations in Remote Radio Units (RRU). The cell definition may also incorporate frequency bands and radio access technology used for transmissions, which means that two different cells may cover the same geographical area but using different frequency bands. Each cell is identified by an identity within the local radio area, which is broadcast in the cell. Another identity identifying the cell 11 uniquely in the whole wireless communication network 1 is also broadcasted in the cell 11. The radio base station 12 communicates over the air or radio interface operating on radio frequencies with the wireless device 10 within range of the radio base station 12. The wireless device 10 transmits data over the radio interface to the radio base station 12 in Uplink (UL) transmissions and the radio base station 12 transmits data over an air or radio interface to the wireless device 10 in Downlink (DL) transmissions.

The wireless device 10 initiates a RA procedure to access the radio base station 12 or access the wireless communication network 1 via the radio base station 12. In case no RA response is received within the specified window a new attempt is made. Depending on a back-off time configured in the wireless device 10, the wireless device 10 may immediately re-try or wait for a time depending on the configured back-off time prior a new attempt. Power of the RA preamble transmission may be increased between transmission attempts of the RA preamble or a new preamble. Frequent and/or long lasting unsuccessful attempts of RA increase interference in the wireless communication network 1 and increase the load of the RA channel such as the PRACH. Hence, this further reduces the RA success probability and resource efficiency.

Timers governing the duration of higher layer procedures, e.g., connection establishment, handover, connection re-establishment, radio link monitoring, typically define much larger durations compared to the interval between transmission attempts of a RA preamble, i.e. the back-off time. While large timer duration provides effective opportunity for recovery from temporary poor radio conditions or high network load situation, large timer duration results in prolonged RA procedures with very frequent RA preamble transmission attempts at comparatively high power.

Embodiments herein reduce the number of RA preamble transmission attempts in that when determined that a problem with the random access procedure has occurred performing at least one of the following:

delay a next random access preamble transmission attempt;

abort, from a higher layer, the random access procedure immediately; and stop the random access procedure at a lower layer. Thus, the amount of radio resources used when accessing the wireless communication network is reduced.

Figure 2:
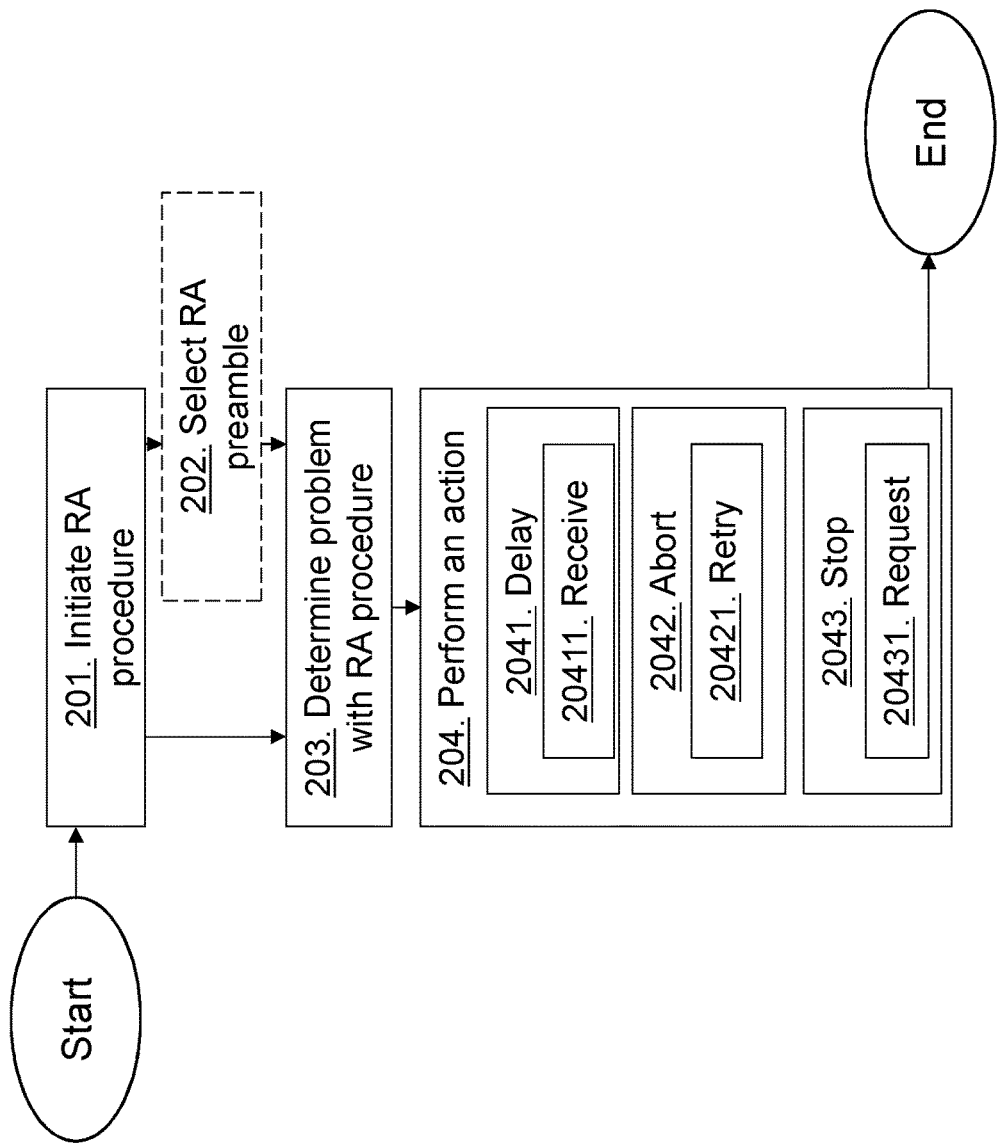
FIG. 2 is a schematic flow chart depicting a method in a wireless device according to embodiments herein.

The method actions in the wireless device 10 for handling access to the radio base station 12 according to some embodiments will now be described with reference to a flowchart depicted in FIG. 2. The actions do not have to be taken in the order stated below, but may be taken in any suitable order. Actions performed in some embodiments are marked with dashed boxes.

Action 201. The wireless device 10 initiates a RA procedure, to access the radio base station 12. E.g. the wireless device 10, before commencing transmitting and/or receiving traffic, has to carry out the RA procedure to the wireless communication network 1, to get synchronized and enabled to communicate within the wireless communication network 1.

Action 202. The wireless device 10 may select a RA preamble out of a pool of RA preambles, or being preconfigured with a number of RA preambles or allocated a RA preamble.

Action 203. The wireless device 10 determines that a problem with the random access procedure has occurred when a certain condition is fulfilled. The condition may for example be one or more of the following: exceeding a number of attempts of transmission of a random access preamble; receiving an indication of a random access problem from a lower layer; transmitting indication of a random access problem to higher layers; and/or that the random access procedure is unsuccessful.

Action 204. The wireless device 10 performs at least one of the following, when determined that a problem with the random access procedure has occurred:

Action 2041. The wireless device 10 may delay a next random access preamble transmission attempt. The wireless device 10 may e.g. receive, action 20411, a value from the radio base station 12, indicating a delay for the wireless device 10 to wait when a counter number of random access attempts have been exceeded before proceeding to the transmission of a next random access preamble. The wireless device 10 may further receive an indication indicating a trigger for when to begin applying the delay. The value may also be a fixed value configured at the wireless device 10. The value may be an actual delay time or delay value, configured at the wireless device 10, received from the radio base station 12, or be a function of/derived from a signalled value; e.g., random delay drawn from distribution controlled by signalled value. The RA preamble selected for the next preamble transmission attempt may or may not be the same. Only when assigned, a dedicated RA preamble, by the network it shall use the same RA preamble for subsequent RA attempts.

As stated, the wireless device 10 is configured to delay RA retransmissions upon a fulfilled condition. Thus, the problems with current technology are solved by introducing a delay between transmission attempts of the RA preamble or RA preambles after a number of transmission attempts of the RA preamble or RA preambles or after lower layers have indicated a random access problem to higher layers. This effectively limits excessive load and interference generated in cases of poor radio conditions or high network load while maintaining desired temporal opportunity to recover from the poor conditions. Furthermore, high performance and low latency is maintained under normal/typical conditions since under normal/typical conditions, the random access procedure is expected to complete successfully before indicating random access problem to higher layers. The delay may e.g. be fixed or configurable.

As an example, this solution may be introduced in the 3GPP TS 36.321, which is the MAC specification, as follows, e.g., before last statement in Section 5.1.2.

if preambleTransMaxDelay is configured and PREAMBLE_TRANSMISSION_COUNTER> preambleTransMax wait for preambleTransmissionMaxDelay before proceeding to the transmission of the Random Access Preamble.

Configuration of preambleTransMaxDelay may be added e.g. to System Information Block 2 (SIB2) in RRC, which is broadcasted in system information (SI) within the cell 11.

Action 2042. The wireless device 10 may abort from a higher layer the random access procedure immediately. In some embodiments the wireless device 10 aborts the random access procedure immediately and also declares a radio link failure, at the higher layer, independently whether a timer is running or not, when receiving the random access problem indication from e.g. the lower layer. The declaring the radio link failure may be performed immediately or at a different time than the aborting. The wireless device 10 may furthermore retry, action 20421, a random access procedure from the higher layer. The retry may be delayed with a delay value. This delay value may be configured at the wireless device 10, received from the radio base station 12, or be a function of/derived from a signalled value; e.g., random delay drawn from distribution controlled by signalled value. It should be mentioned that RLF may never be executed and it is expected to at least under some conditions the wireless device 10 may declare RLF at a later time than the retrying. It may also be the case that the RLF is cancelled and/or the point of declaring RLF is not reached.

The wireless device 10 may be configured to report or declare RLF when receiving indication, from lower layers, of RA problems, independently of one or more timers running at the higher layer procedures. Thus, the problems with prior art technology may be solved e.g. by higher layer declares radio link failure immediately when receiving the random access problem indication from lower layers, independent of running timers for higher layer procedures. This effectively limits excessive load and interference generated in cases of poor radio conditions or high network load. If needed, recovery from temporary poor radio conditions or high network load may be handled by higher layer connection re-establishment procedure or retry of higher layer procedures. Retry and random access preamble transmission frequencies/intensities may be reduced with a delay value between higher layer attempts. The delay value may be fixed or configurable e.g. configured at the wireless device 10, received from the radio base station 12, or be a function of/derived from a signalled value; e.g., random delay drawn from distribution controlled by signalled value. Furthermore the delay value may be based on e.g., expiry of an existing timer, expiry of an existing and already running timer, a new timer. Thus, in some embodiments the radio base station 12 introduces a delay value upon a fulfilled condition.

Action 2043. The wireless device 10 may stop the random access procedure at a lower layer. The wireless device 10 may e.g. request, action 20431, by a higher layer, the lower layer to retry an extended number of times of attempts of transmission of the random access preamble before stopping the random access procedure at the lower layer. A delay time may introduced between the attempts of the extended number of attempts. The delay time may be received from the radio base station 12 or being a fixed configured value, or be a function of/derived from a signalled value; e.g., random delay drawn from distribution controlled by signalled value. This extension of attempts may be defined by a, configurable, timer instead of a by a, configurable, number of RA preamble transmission attempts.

In other words, the wireless device 10 is configured to interrupt or stop random access procedure when transferring indication, to higher layers, of RA problems, or when condition fulfilled. Thus, the problems with current technology are solved by a lower layer stopping transmission attempts of the RA preamble or RA preambles upon having made a (configurable) number of attempts or upon indicating random access problem to higher layers. This effectively limits excessive load and interference generated in cases of poor radio conditions or high network load. If needed, opportunity for recovery from temporary poor radio conditions or high network load may be provided by an extended number of RA preamble transmission attempts; fixed or configurable; generic or depending on use case. If needed, opportunity for recovery from temporary poor radio conditions or high network load may also be handled by higher layers requesting lower layers to retry random access procedure. Retry and random access preamble transmission frequencies/intensities may be reduced with a delay time between higher layer attempts. The delay time may be fixed or configurable. Furthermore the delay time may be based on e.g., expiry of an existing timer, expiry of an existing and already running timer, a new timer.

Embodiments herein effectively reduce intensity of random access preamble transmission attempts for the relevant cases of extended access procedures and avoids unnecessary service interruptions and degradation. Random access related load and interference generated is effectively limited and random access and system performance improved. It is in current art/standard so that upon receiving an indication of random access problem from lower layer, MAC, RRC declares RLF if neither of a number of timers, related to different procedures, e.g.: radio link monitoring, hand over, connection establishment/reestablishment, are running. The problem with current art/standard is that the aforementioned timers, if running, prevents RRC from declaring RLF based on the RA problem indication and, hence, prolongs the random access procedure in lower layer such as MAC layer, resulting in excessive RA preamble transmission attempts. Embodiments herein limits the rate of random access preamble transmission attempts after a set threshold of attempts.

Figure 3:
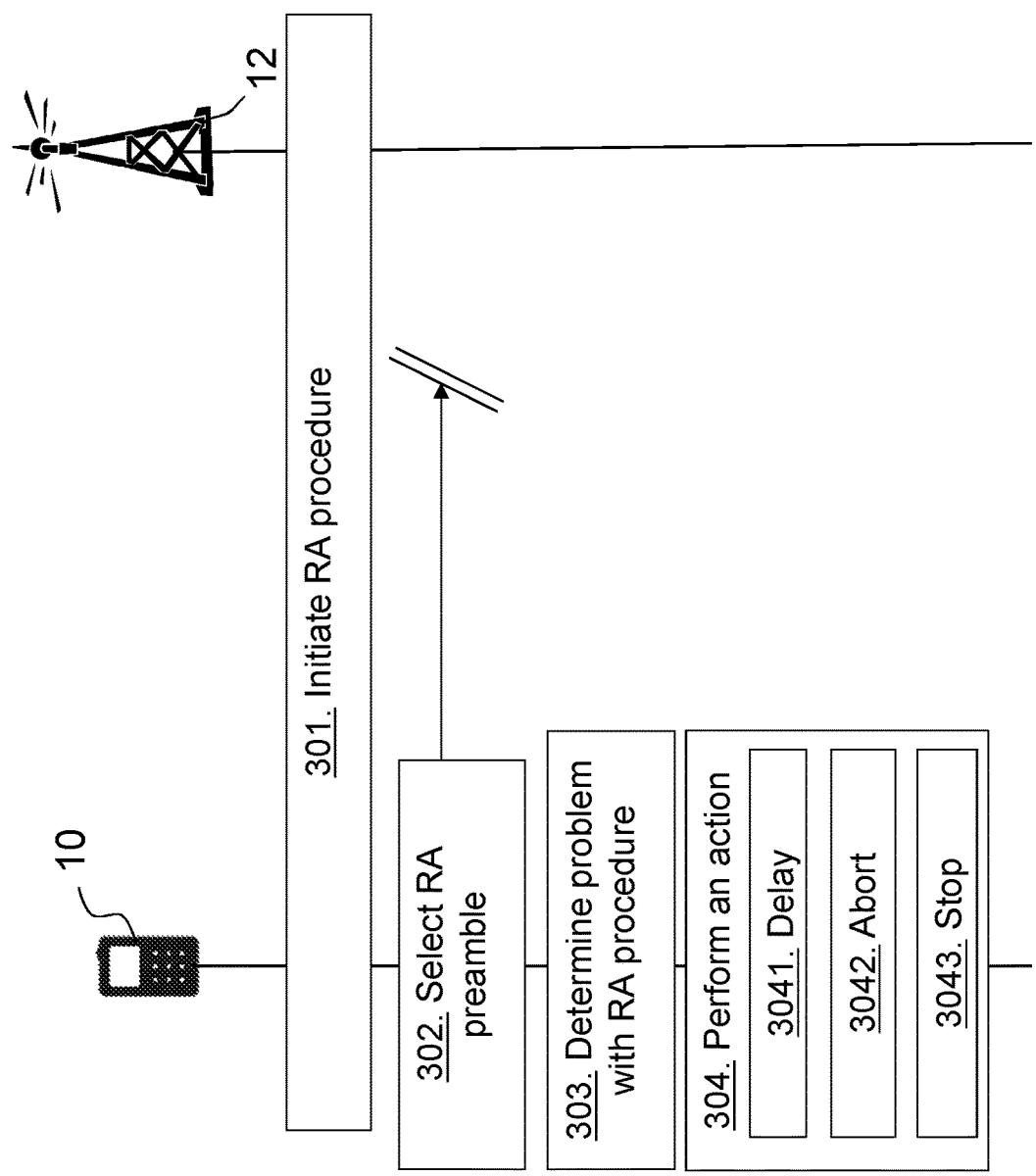
FIG. 3 is a schematic flowchart and signalling scheme depicting embodiments herein.

In FIG. 3 a schematic combined signaling and flowchart of some embodiments disclosed herein.

Action 301. The wireless device 10 initiates a random access procedure in the wireless communication network 1. This action corresponds to action 201 in FIG. 2.

Action 302. The wireless device 10 selects a RA preamble out of a number of RA preambles and transmits the RA preamble in a RA request. This action corresponds to action 202 in FIG. 2.

Action 303. The wireless device 10 determines a problem with the random access procedure when a certain condition is fulfilled. The condition may be: exceeding a number of attempts of RA preamble transmissions; receiving an indication of a random access problem from a lower layer; transmitting indication of a random access problem to higher layers; the RA is unsuccessful. The condition, e.g. indication of number of attempts, may be received in system information (SI) broadcasted within the cell 11. Such an indication may be a preambleTransMax IE in the SI. This action corresponds to action 203 in FIG. 2.

Action 304. The wireless device 10 may then perform at least one of the following actions, when determined that a problem with RA has occurred. This action corresponds to action 204 in FIG. 2.

Action 3041. The wireless device 10 may delay a next random access preamble transmission attempt, maybe with a higher power. This action corresponds to action 2041 in FIG. 2.

Action 3042. The wireless device 10 may abort immediately, e.g. without taking one or more timers into account, in the higher layer, such as the RRC layer, the RA procedure and may also declare a radio link failure. RRC is just an example and RA procedure may be, and in LTE typically is, triggered by "data becoming available for transmission" at a higher layer, in e.g. LTE higher than MAC, such as e.g. Packet Data Convergence Protocol (PDCP) or Radio Link Control (RLC). Thus, RRC could be one example, RLC and PDCP are other examples of higher layers which may trigger a RA procedure. In LTE, RA can also be triggered by L1/L2 control signaling, PDCCH ordered RA. The trigger may be explicit, as for e.g. PDCCH ordered RA, or implicit, as for e.g. the case of data becoming available for transmission in LTE. This action corresponds to action 2042 in FIG. 2.

Action 3043. The wireless device 10 may stop the random access procedure at the lower layer, such as the MAC layer. The wireless device 10 may be ordered, from the higher layer, to make an extended number of RA preamble transmission attempts before stopping the random access procedure at the lower layer. This extension of attempts may be defined by a (configurable) timer instead of a by a (configurable) number of RA preamble transmission attempts. This action corresponds to action 2043 in FIG. 2.

Timers/delays/thresholds may be given as fixed values by specifications or configured with wireless device dedicated/specific signalling or Cell or system wide common/broadcast signalling, System Information. Alternatively configuration could be provided with a random access response. The radio base station 12 may thus transmit data such as system information or RA response with configuration of the delay/threshold/timer or a flag indicating whether to use delay/threshold/timer.

FIGS. 4a-4d disclose transmissions of a preamble of a random access, also referred to as attempts of transmission of a random access preamble or preamble attempts, marked as vertical lines, along a time line.

Figure 4:
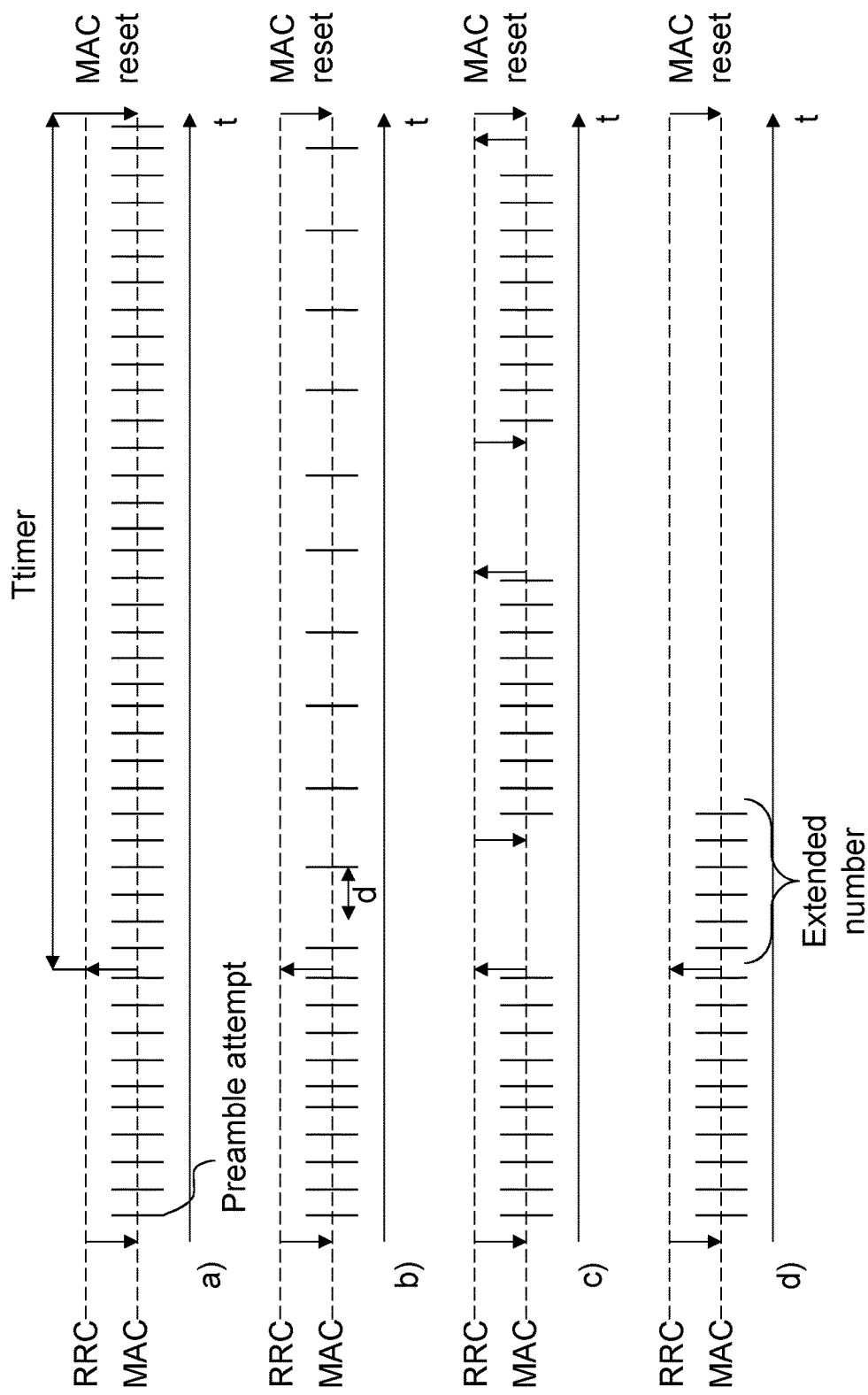
FIGS. 4a-4d are schematic figure illustrating embodiments herein compared to prior art.

FIG. 4a discloses a random access procedure according to a prior art technique. As can be seen a higher layer, e.g. RRC layer, orders the random access procedure initiation. The lower layer, MAC layer, starts performing transmissions of the RA preamble. After performing the transmission of the RA preamble a number of times, being configured in the wireless device 10, it is determined that a problem with the random access procedure has occurred and the lower layer sends an indication that there is a problem with the random access procedure. The lower lay then continues to transmit the RA preamble until one or more periods of one or more timers, Ttimer, has ended and then the higher layer sends a MAC reset to the lower layer resetting the random access procedure. This process ends up in a plurality of RA preamble attempts along the time line and is a resource consuming process in the wireless communication network 1.

FIG. 4b discloses the random access procedure according to embodiments herein when the wireless device 10 performs the delaying according to actions 2041 and 3041 above. The higher layer, e.g. RRC layer, orders the random access procedure initiation. The lower layer, MAC layer, starts performing transmissions of the RA preamble. After performing the transmission of the RA preamble a number of times it is determined that a problem with the random access procedure has occurred and the lower layer sends an indication that there is a problem with the random access procedure. The lower lay then continues to transmit the RA preamble but with an introduced delay, d, between the transmissions. This is done until one or more periods of one or more timers, Ttimer, has ended and then the higher layer sends a MAC reset to the lower layer resetting the random access procedure. This reduces the number of attempts, but may maintain duration/opportunity to recover, and the resources used in the process.

FIG. 4c discloses the random access procedure when the wireless device 10 performs the aborting according to actions 2042 and 3042 above. The higher layer, e.g. RRC layer, orders the random access procedure initiation. The lower layer, MAC layer, starts performing transmissions of the RA preamble. After performing the transmission of the RA preamble a number of times it is determined that a problem with the random access procedure has occurred and the lower layer sends an indication that there is a problem with the random access procedure. The higher layer then aborts the random access procedure immediately and may declare RLF. The retry of random access procedure or RLF recovery procedure may be delayed and does not commence immediately/at the same time as RA procedure is aborted. This abort and retry-procedure is looped or repeated until one or more periods of one or more timers, Ttimer, has ended and then the higher layer sends a MAC reset to the lower layer resetting the random access procedure. As seen this way of aborting reduces the number of attempts along the time line and the resources used in the process.

FIG. 4d discloses the random access procedure when the wireless device 10 performs the stopping according to actions 2043 and 3043 above. The higher layer, e.g. RRC layer, orders the random access procedure initiation. The lower layer, MAC layer, starts performing transmissions of the RA preamble. After performing the transmission of the RA preamble a number of times it is determined that a problem with the random access procedure has occurred and the lower layer sends an indication that there is a problem with the random access procedure. The lower layer may then stop the random access procedure or as shown the lower layer may retry an extended number of times of attempts of transmission of the random access preamble, indicated by the higher layer, before stopping the random access procedure at the lower layer. As seen this way of stopping reduces the number of attempts along the time line and the resources used in the process.

Figure 5:
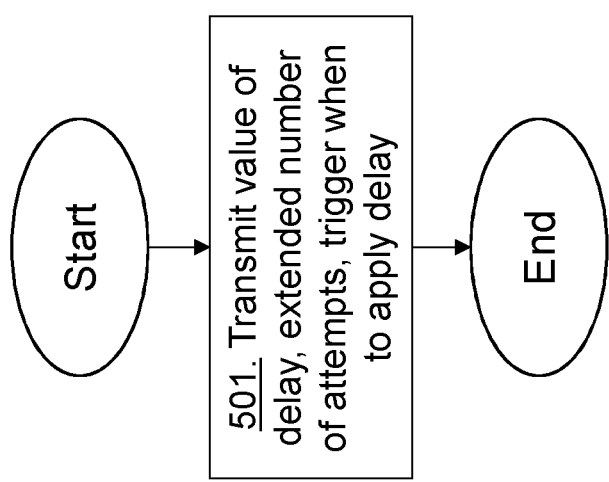
FIG. 5 is a schematic flowchart depicting a method in a radio base station.

The method actions in the radio base station 12 for handling access to the radio base station 12 according to some embodiments will now be described with reference to a flowchart depicted in FIG. 5.

Action 501. The radio base station 12 may transmit a value indicating a delay for the wireless device 10 to wait when a counter number of random access attempts have been exceeded before proceeding to the transmission of a next random access preamble. Additionally or alternatively, the radio base station 12 may transmit an indication indicating a trigger for when to begin applying a delay, and/or an indication indicating an extended number of times of attempts of transmission of the random access preamble before stopping the random access procedure at the lower layer. This may be performed in broadcasting of system information and/or upon configuration of the wireless device 10.

Figure 6:
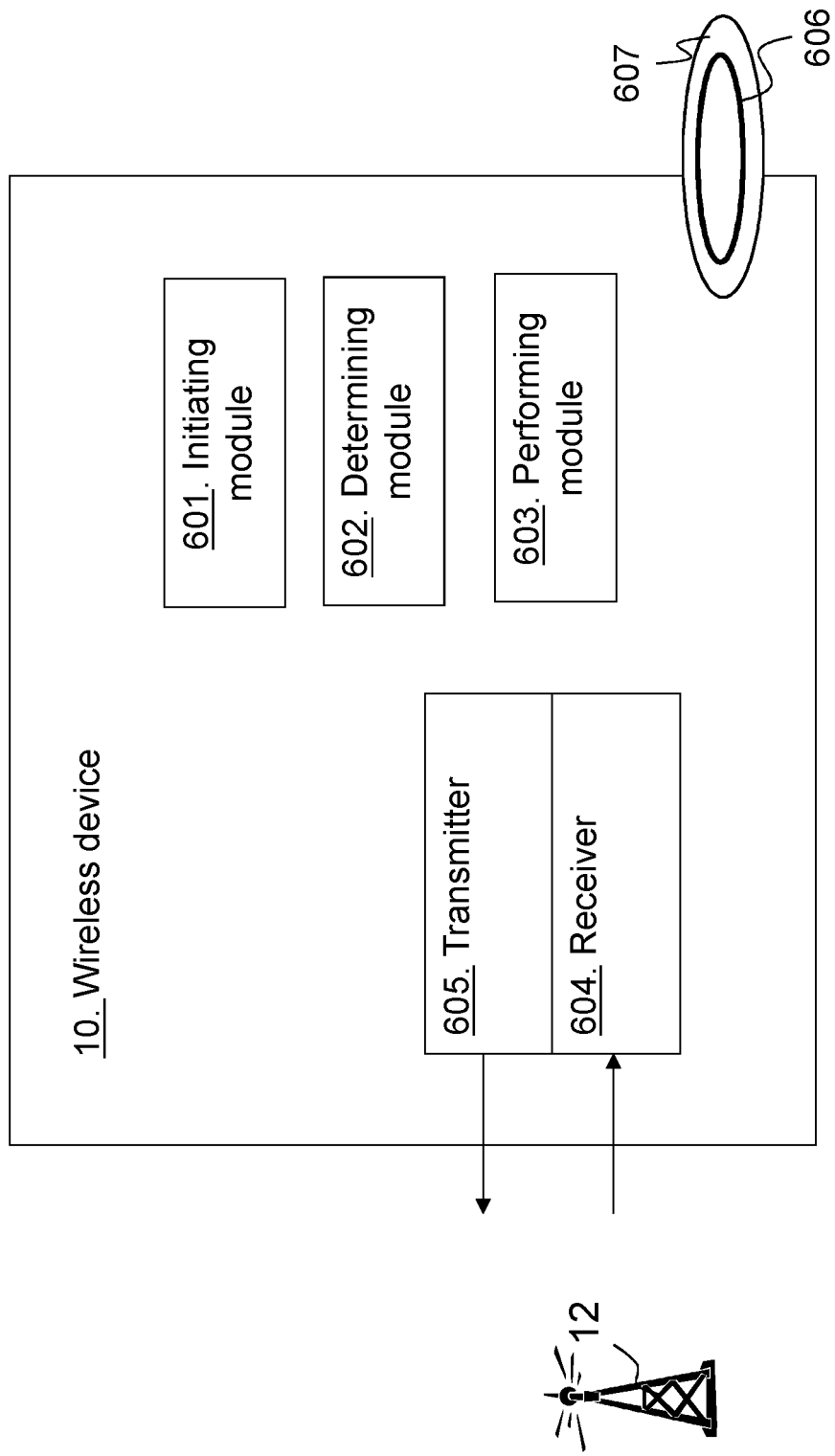
FIG. 6 is a block diagram depicting a wireless device according to embodiments herein.

According to perform the actions herein a wireless device is provided. FIG. 6 shows a block diagram depicting the wireless device 10 for handling access to the radio base station 12 in the wireless communication network 1 according to embodiments herein.

The wireless device 10 may comprise an initiating module 601. The wireless device 10, and/or the initiating module 601, may be configured to initiate a random access procedure in the wireless communication network 1.

The wireless device 10 may comprise a determining module 602. The wireless device 10, and/or the determining module 602, may be configured to determine that a problem with the random access procedure has occurred when a certain condition is fulfilled. The condition may be one or more of the following: exceeding a number of attempts of transmission of a random access preamble; receiving an indication of a random access problem from a lower layer; transmitting indication of a random access problem to a higher layer; and/or that the random access procedure is unsuccessful.

The wireless device 10 may comprise a performing module 603. The wireless device 10, and/or the performing module 603, may be configured to perform at least one of the following, when determined that a problem with the random access procedure has occurred: delay a next random access preamble transmission attempt; abort from a higher layer the random access procedure immediately; and stop the random access procedure at a lower layer. The wireless device 10, and/or the performing module 603, may be configured to perform by delaying the next random access preamble transmission attempt.

The wireless device 10 may comprise a receiver 604. The wireless device 10, and/or the receiver 604, may also be configured to receive a value from the radio base station 12. The value may be indicating a delay for the wireless device 10 to wait when a counter number of random access attempts have been exceeded before proceeding to the transmission of a next random access preamble. The wireless device 10, and/or the receiver 604, may also be configured to receive an indication indicating a trigger for when to begin applying a delay.

The wireless device 10, and/or the performing module 603, may be configured to perform by aborting the random access procedure immediately and declaring a radio link failure, at the higher layer, independently whether a timer is running or not, when receiving a random access problem indication from the lower layer. The wireless device 10, and/or the performing module 603, may be configured to declare the radio link failure immediately or at a different time than the aborting. The wireless device 10, and/or the performing module 603, may be configured to retry a random access procedure from the higher layer. The retried random access procedure may be delayed with a delay value. The delay value may be received from the radio base station 12.

The wireless device 10, and/or the performing module 603, may be configured to perform by stopping the random access procedure at the lower layer, and further being configured to request, by a higher layer, the lower layer to retry an extended number of times of attempts of transmission of the random access preamble before stopping the random access procedure at the lower layer. The wireless device 10, and/or the performing module 603, may be configured to introduce a delay time between the attempts of the extended number of attempts. The wireless device 10, and/or the receiver 604, may also be configured to receive an indication indicating the extended number of times of attempts of transmission of the random access preamble from the radio base station 12.

The higher layer may be a RRC layer, PDCP layer, RLC layer, and the lower layer may be a MAC layer. As stated herein, the delay/delay time/delay value applied by the wireless device 10 may be the signalled/configured/specified value or a function thereof.

The wireless device 10 comprises a transmitter 605 that may be configured to transmit the RA preamble to the radio base station 12. The receiver 604 and transmitter 605 may be implemented as a transceiver.

Figure 7:
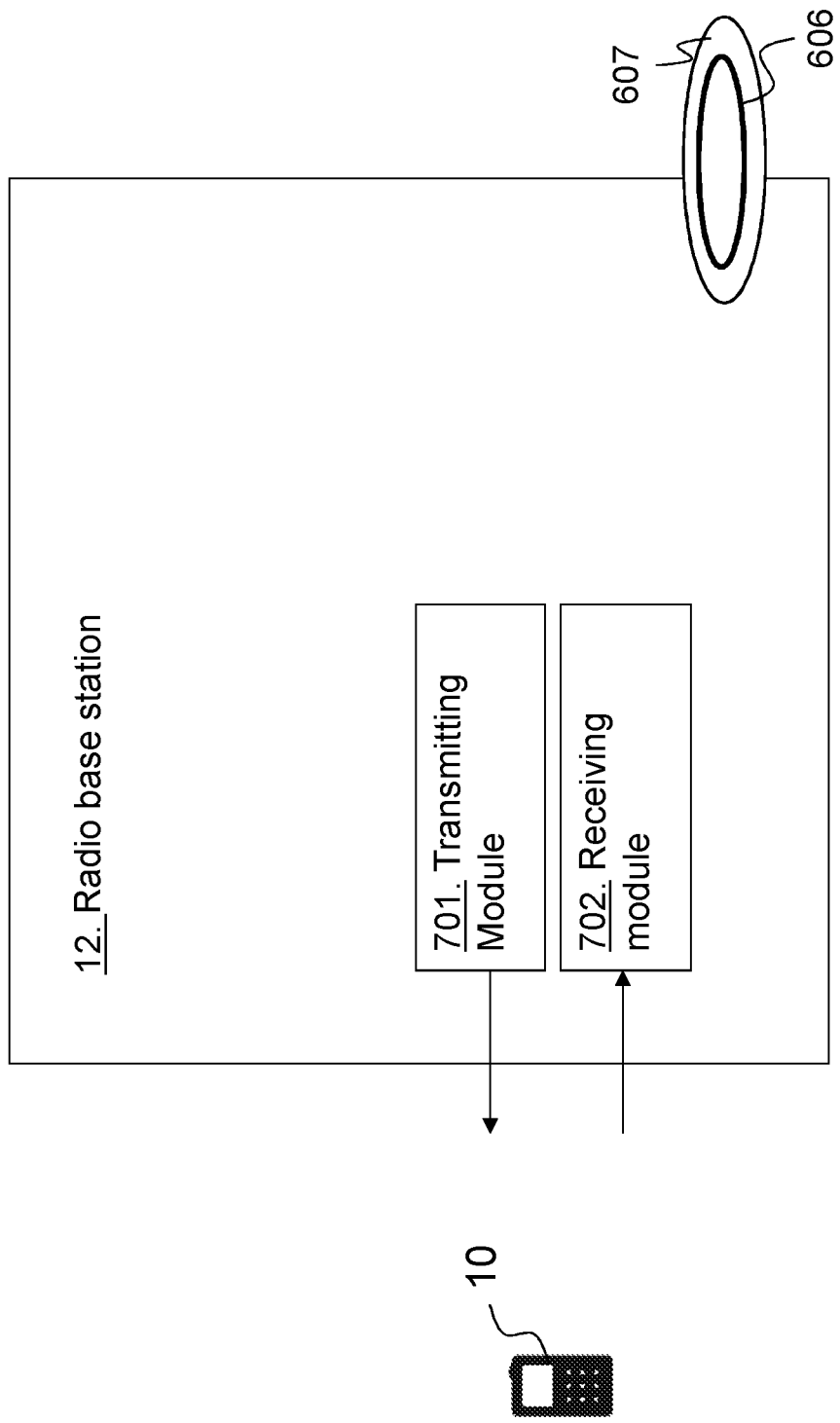
FIG. 7 is a block diagram depicting a radio base station according to embodiments herein.

According to perform the actions herein a radio base station is provided. FIG. 7 shows a block diagram depicting the radio base station 12 for handling access to the radio base station 12 in the wireless communication network 1 according to embodiments herein.

The radio base station 12 may comprise a transmitting module 701. The radio base station 12 and/or the transmitting module 701 may be configured to transmit a value indicating a delay for the wireless device 10 to wait when a counter number of random access attempts have been exceeded before proceeding to the transmission of a next random access preamble. Additionally or alternatively, the radio base station 12 and/or the transmitting module 701 may be configured to transmit an indication indicating a trigger for when to begin applying a delay, and/or an indication indicating an extended number of times of attempts of transmission of the random access preamble before stopping the random access procedure at the lower layer.

The radio base station 12 may comprise a receiving module 702. The radio base station 12 and/or the receiving module 702 may be configured to receive data from the wireless device 10 such as RA preambles or such. The receiving module 702 and the transmitting module 701 may be implemented as a transceiver or a transceiving module.

Those skilled in the art will also appreciate that the various "modules" described may refer to a combination of analogue and digital circuits, and/or one or more processors configured with software and/or firmware, e.g., stored in memory, that, when executed by the one or more processors, perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

Thus, the methods according to the embodiments described herein for the wireless device 10 and/or radio base station 12 are respectively implemented by means of a computer program 606 in FIGS. 6 and 7, comprising instructions, i.e., software code portions, which, when executed on at least one processor, cause the at least one processor to carry out the actions described herein, as performed by the wireless device 10 or the radio base station 12. The computer program may be stored on a computer-readable storage medium 607. The computer-readable storage medium 607, having stored thereon the computer program 606, may comprise the instructions which, when executed on at least one processor, cause the at least one processor to carry out the actions described herein, as performed by the wireless device 10 or the radio base station 12. In some embodiments, the computer-readable storage medium 607 may be a non-transitory computer-readable storage medium.

Figure 8:
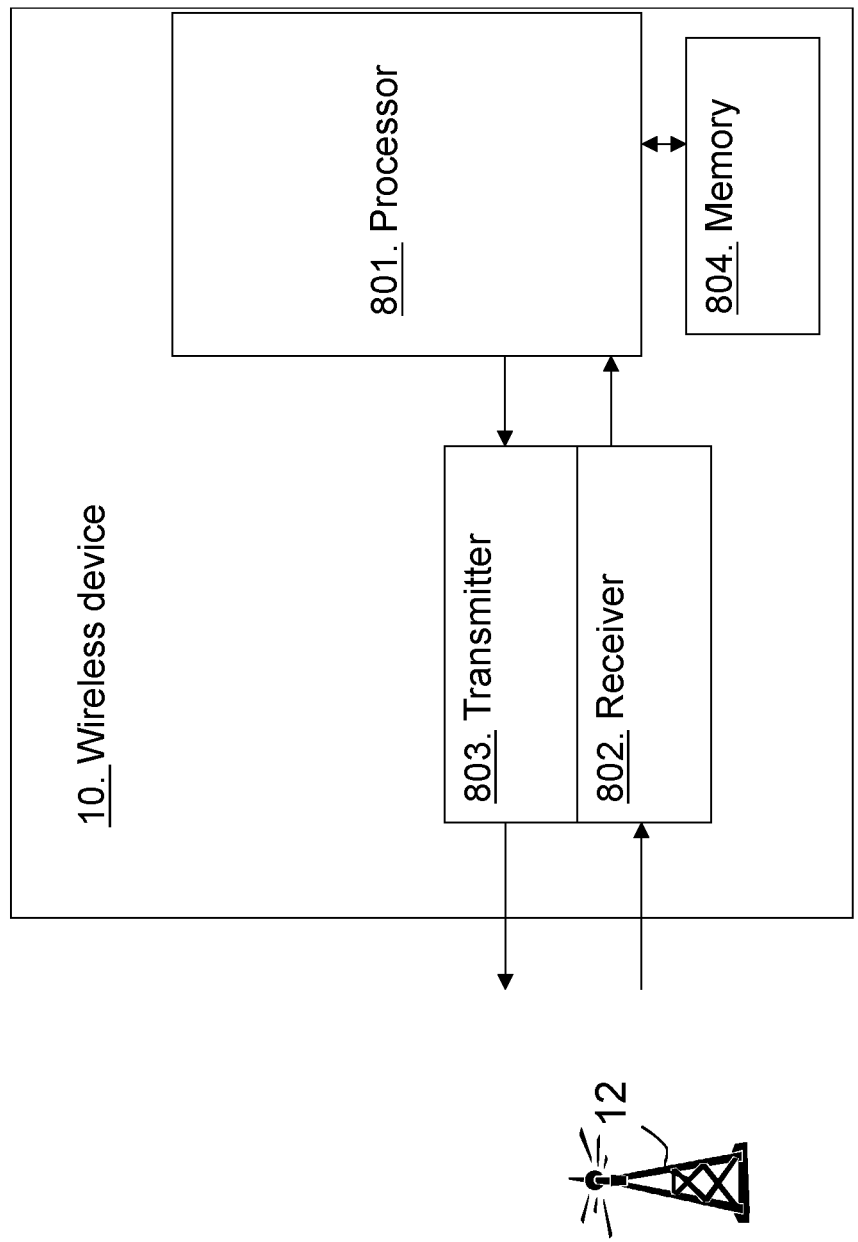
FIG. 8 is a block diagram depicting a wireless device according to embodiments herein.

The embodiments herein for handling access to a wireless communication network may be implemented through one or more processors 801 or processing means in the wireless device 10 depicted in FIG. 8, together with computer program code for performing the functions and/or method actions of the embodiments herein. The program code mentioned above may also be provided as a computer program product, for instance in the form of a data carrier carrying computer program code for performing embodiments herein when being loaded into the wireless device 10. One such carrier may be in the form of a CD ROM disc. It is however feasible with other data carriers such as a memory stick. The computer program code may furthermore be provided as pure program code on a server and downloaded to the wireless device 10.

The wireless device 10 further comprises a receiver 802 that may be configured to receive information or data from the radio base station 12, such as SI with indication of implementing delay or not. The wireless device 10 further comprises a transmitter 803 that may be configured to transmit data such as RA preambles and similar.

The wireless device 10 also comprise a memory 804 that may be used to store data on such a RA preambles and further information or applications to perform methods herein when being executed.

Figure 9:
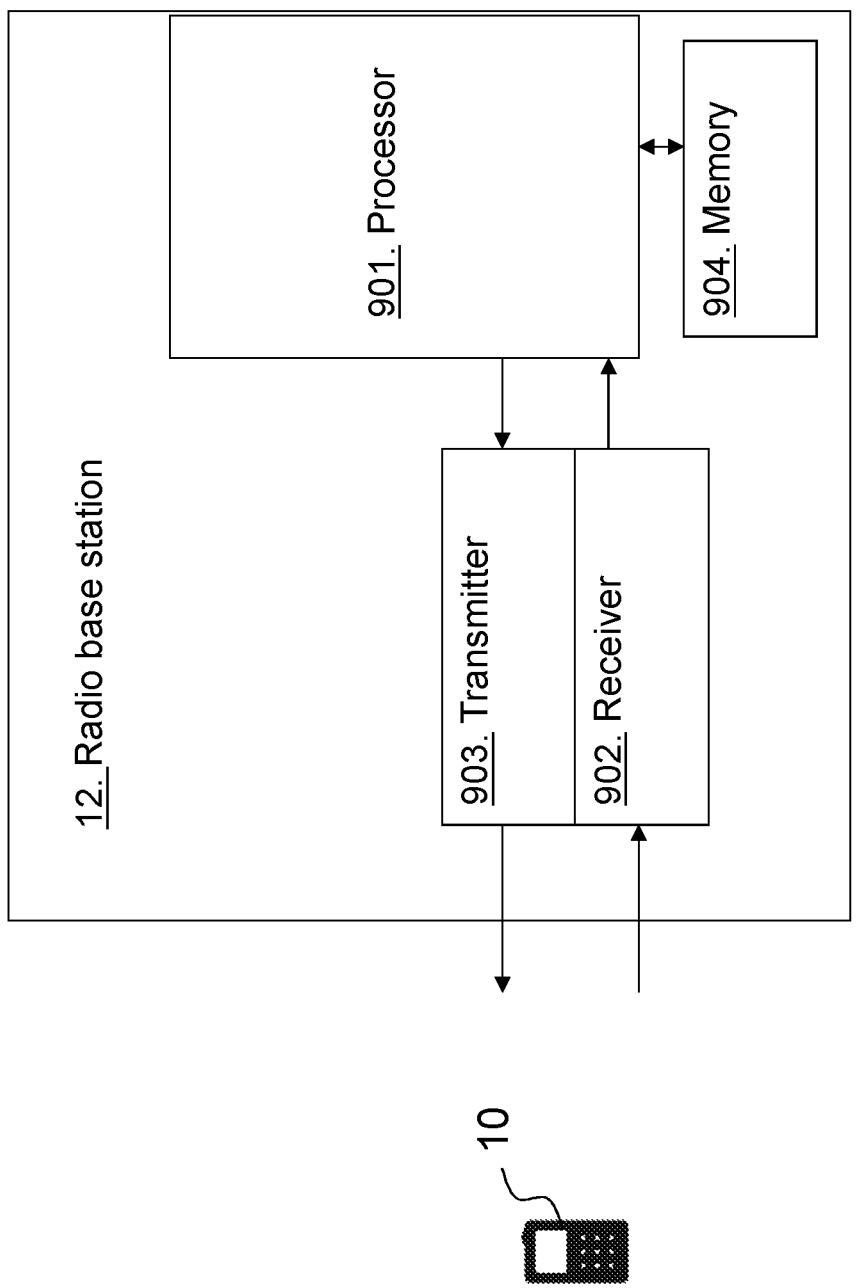
FIG. 9 is a block diagram depicting a radio base station according to embodiments herein.

The embodiments herein for handling access to a wireless communication network may be implemented through one or more processors 901 or processing means in the radio base station 12 depicted in FIG. 9, together with computer program code for performing the functions and/or method actions of the embodiments herein. The program code mentioned above may also be provided as a computer program product, for instance in the form of a data carrier carrying computer program code for performing embodiments herein when being loaded into the radio base station 12. One such carrier may be in the form of a CD ROM disc. It is however feasible with other data carriers such as a memory stick. The computer program code may furthermore be provided as pure program code on a server and downloaded to the radio base station 12.

The radio base station 12 further comprises a receiver 902 that may be configured to receive information or data from the wireless device 10 such as RA preambles and similar. The radio base station 12 further comprises a transmitter 903 that may be configured to transmit data such as SI, RA response with indication of implementing delay or not.

The radio base station 12 also comprise a memory 904 that may be used to store data on such a RA preambles and further information or applications to perform methods herein when being executed.

As will be readily understood by those familiar with communications design and as stated above, functions from modules may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of a wireless device or radio base station, for example.

Alternatively, several of the functional elements of the modules, processors or processing means discussed may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware, read-only memory (ROM) for storing software, random-access memory for storing software and/or program or application data, and non-volatile memory. Other hardware, conventional and/or custom, may also be included. Designers of communications receivers will appreciate the cost, performance, and maintenance tradeoffs inherent in these design choices.

According to an aspect the object of providing an efficient way of accessing a wireless communication network is achieved by a method in the wireless device 10 for handling access to a radio base station. The wireless device 10 may perform a random access procedure and a condition has been fulfilled, such as number of RA preamble transmission attempts is above a set threshold value or after lower layers have indicated a random access problem to higher layers. The wireless device 10 may then delay re-transmission of RA preambles.

According to an aspect the object is achieved by a method in the wireless device 10 wherein the wireless device 10 may declare or report RLF when receiving indication, from lower layers, of RA problems, independently of timers running at the higher layer procedures.

According to an aspect the object is achieved by a method in the wireless device 10 for handling access to the radio base station 12. The wireless device 10 may perform a random access procedure and interrupt it or stops the random access procedure when transferring indication, to higher layers, of RA problems, or when condition fulfilled.

As alternative embodiments, the point after which a delay is introduced between RA preamble transmission attempts or after which lower layers stops random access preamble transmission attempts can be defined by a (configurable) timer instead of a by a (configurable) number of RA preamble transmission attempts. Timers/delays/thresholds can be given as fixed values by specifications or configured with UE dedicated/specific signalling or Cell or system wide common/broadcast signalling (System Information). Alternatively configuration could be provided with the random access response.

A method in the radio base station 12 for handling access of the wireless device 10 to the radio base station 12. The radio base station 12 may transmit data such as system information or RA response with configuration of the delay/threshold/timer or a flag indicating whether to use delay/threshold.

The application of a delay between RA preamble transmission attempts or bursts of RA preamble transmission attempts could always be enabled or be controlled by a flag or indicator in UE dedicated/specific signalling or Cell or system wide common/broadcast signaling, System Information comprising the information from the radio base station. Alternatively it could be controlled with the random access response.

Embodiments herein disclose further the wireless device 10 and the radio base station 12 being configured to perform methods disclosed herein.

Embodiments herein provide the advantage to effectively reduce intensity of random access preamble transmission attempts for the relevant cases of extended access procedures and avoids unnecessary service interruptions and degradation. Random access related load and interference generated is effectively limited and random access and system performance improved.

It will be appreciated that the foregoing description and the accompanying drawings represent non-limiting examples of the methods and apparatus taught herein. As such, the inventive apparatus and techniques taught herein are not limited by the foregoing description and accompanying drawings. Instead, the embodiments herein are limited only by the following claims and their legal equivalents.

The invention claimed is:

1. A method in a wireless device for handling access to a radio base station in a wireless communication network, comprising
    initiating a lower-layer random access procedure, in the wireless communication network, while one or more timers associated with a Radio Resource Control (RRC) layer procedure are running;
    determining, at the RRC layer and subsequent to a first plurality of random access preamble transmission attempts, that a problem with the random access procedure has occurred based on receiving an indication of the problem from the lower layer; and
    responsive to determining that the problem occurred,
        aborting from the RRC layer the random access procedure immediately and declaring a radio link failure, at the RRC layer, without taking into account the one or more running timers associated with the RRC-layer procedure.

2. The method according to claim 1, wherein the declaring the radio link failure is performed concurrent with or subsequent to the aborting.

3. A wireless device for handling access to a radio base station in a wireless communication network, the wireless device comprising:
    at least one processor; and
    at least one memory comprising program instructions that, when executed by the at least one processor, configure the wireless device to:
        initiate a lower-layer random access procedure, in the wireless communication network, while one or more timers associated with a Radio Resource Control (RRC) layer procedure are running;
        determine, at the RRC layer and subsequent to a first plurality of random access preamble transmission attempts, that a problem with the random access procedure has occurred based on receiving an indication of the problem from the lower layer; and
        responsive to the determination that the problem with the random access procedure has occurred,
            abort from the RRC layer the random access procedure immediately and declare a radio link failure, at the RRC layer, without taking into account the one or more running timers associated with the RRC-layer procedure.

4. The wireless device according to claim 3, being configured by the executed instructions to declare the radio link failure concurrent with or subsequent to the aborting.

5. A non-transitory computer-readable medium storing a computer program comprising program instructions that, when executed by processing circuitry in a wireless device, configures the wireless device to handle access to a radio base station in a wireless communication network, said computer program comprising program instructions configuring the wireless device to:
    initiate a lower-layer random access procedure, in the wireless communication network, while one or more timers associated with a Radio Resource Control (RRC) layer procedure are running;
    determine, at the RRC layer and subsequent to a first plurality of random access preamble transmission attempts, that a problem with the random access procedure has occurred based on receiving an indication of the problem from the lower layer; and
    responsive to determining that the problem occurred,
        abort from the RRC layer the random access procedure immediately and declare a radio link failure, at the RRC layer, without taking into account the one or more running timers associated with the RRC-layer procedure.

* * * * *